Oct. 11, 1949.  N. H. SHAW  2,484,250

GENERATOR FED MOTOR CONTROL SYSTEM

Filed April 21, 1948

WITNESSES:
Robert C. Baird
Nw. C. Groove

INVENTOR
Norman H. Shaw.
BY
Paul E. Friedemann
ATTORNEY

Patented Oct. 11, 1949

2,484,250

UNITED STATES PATENT OFFICE 2,484,250

GENERATOR FED MOTOR CONTROL SYSTEM

Norman Harry Shaw, Stafford, England, assignor to The English Electric Company, Limited, London, England, a British company Application April 21, 1948, Serial No. 22,353
In Great Britain April 24, 1947

9 Claims. (Cl. 318—142)

My invention relates to electric systems of control, and more particularly to systems of control generally of the Ward-Leonard type for controlling the operation of direct-current motors.

One object of my invention is the provision of a compensating excitation for an amplifying generator that is a function of the resistance change in the main field windings of the generator with changes of temperature of the main field windings.

Another object of my invention is the provision of a compensation excitation for an amplifying generator that is a function of the resistance change in a resistive load on the generator with changes of resistance of this load due to changes of temperature thereof.

A more specific object of my invention is the provision of field windings for a generator that are divided into two equal parts which are connected, respectively, as two opposite legs of a Wheatstone bridge, the bridge being completed by two equal resistors each having, when cold, and when the field windings are cold, a resistance value equal to the resistance value of each of the parts of the field windings, with the resistors having substantially zero temperature coefficients, provision being made to alter the excitation of an amplifying exciter which excites these field windings, the alteration being as a function of the voltage change between the junction of one resistor and one part of the field windings and the other junction of the other resistor and the other part of the field windings.

Another general object of my invention is to provide an amplifying generator with a field winding so arranged that its exciting current varies in accordance with the rate of change of output current from the amplifying generator. This feature of my invention is particularly applicable when the amplifying generator has differential excitation in accordance with the magnitude of a controlled quantity, the differential excitation acting in opposition to a controlled excitation and under steady condition being merely equal and opposite.

Figure 1:
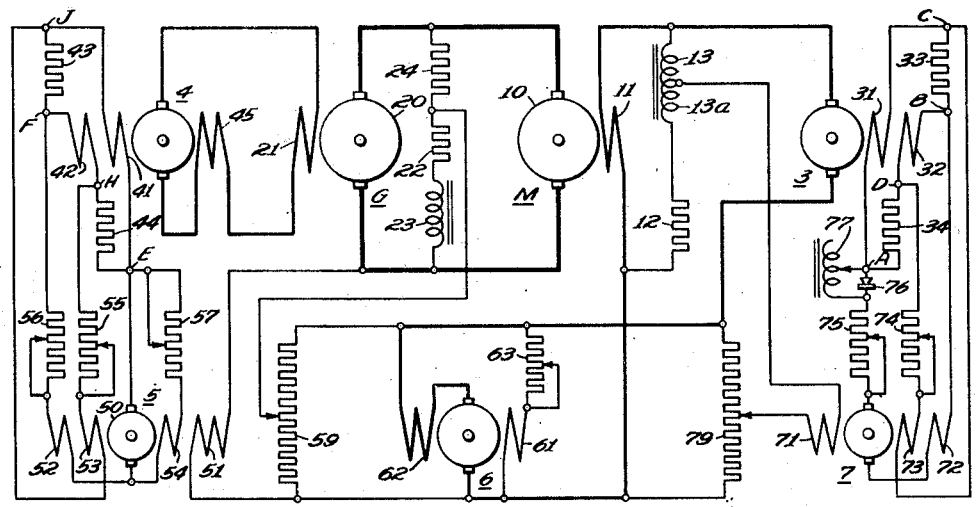
Figure 2:
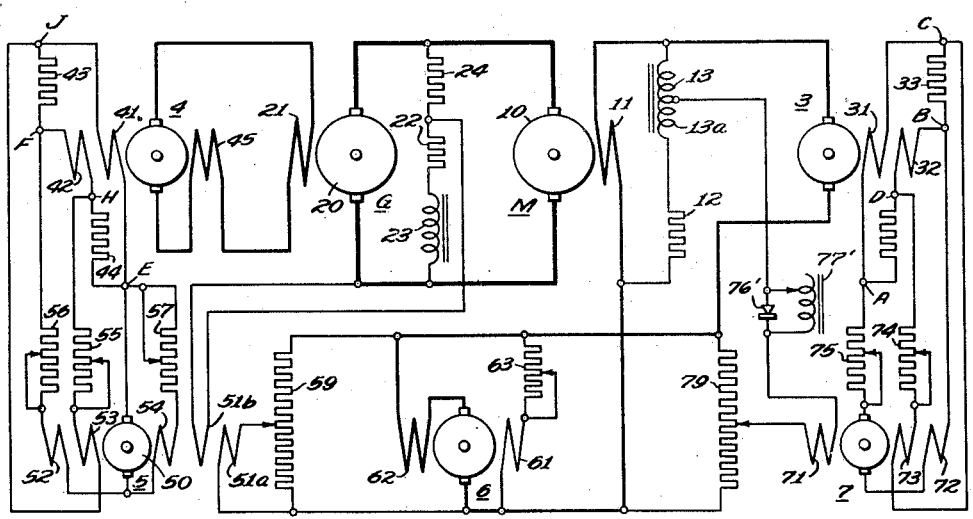

The objects hereinbefore recited are merely illustrative. Other objects and advantages will become more apparent from a study of the following specification and the accompanying drawing, in which:

Figure 1 is a diagrammatic showing of a preferred arrangement of my electric system of control; and Fig. 2 is a diagrammatic showing of a modification of my invention.

In the figures of the drawing, M designates the main motor, the operation of which is to be controlled, and G designates the main generator supplying the electric energy to the main motor M.

The field winding 11 of the main motor M is supplied from a constant potential exciter 6, and the field control is effected through a potentiometer 79 and a bucking exciter 3. The excitation of the bucking exciter is, in turn, supplied from an amplifying generator 7.

The field winding 21 of the main generator G is supplied with exciting energy from the exciter 4 which in turn is excited from the amplifying generator 5. The amplifying generator 5 is controlled in its excitation from its own voltage and from the voltage of the constant potential exciter 6. The details are more involved than here stated and will become clear presently.

Exciter 6 and sub-exciters 5 and 7 are driven at (at least approximately) constant speed, for example by one or more synchronous motors or one or more induction motors operating on alternating mains supply. Exciters 3 and 4 will usually be similarly driven, but the speed of generator G may be allowed to fall by 20% or so on the occurrence of peak loads of short duration, so that energy may be supplied by a flywheel coupled to this generator.

Over the lower part of the speed range required of motor M, speed control is effected by variation of the output voltage of generator G by variation of the setting of tapping L on generator excitation control potentiometer 59. Over the higher part of the speed range, speed control is effected by variation of the field of motor M by variation of the setting of motor excitation control potentiometer 79.

The main field winding of exciter 4 is divided into two equal sections 41, 42 which are arranged as opposite arms of a bridge. The bridge is completed by resistors 43, 44, the resistance values of which are equal to those of winding sections 41, 42 when cold.

In addition to its main field winding, exciter 4 has a negative series field winding 45 to increase the speed of response of the current in generator field winding 21 to changes of the current in the main field winding 41, 42 of the exciter.

By its corners EF, the field winding bridge of exciter 4 is connected in series with an adjustable resistor 56 to form the output circuit of sub-exciter 5.

Sub-exciter 5 is shown as having both a series field winding 52 and a shunt field winding 54, the latter being provided with a field rheostat 57. Either one of these field windings 52 and 54 may, however, be omitted. Sub-exciter 5 is also provided with an auxiliary field winding 53 connected in series with an adjustable resistor 55 across the output corners JH of the field winding bridge of exciter 4. Further excitation for sub-exciter 5, which may sometimes support and sometimes detract from the self-excitation, is provided by a control field winding 51.

The sub-exciter 5 is designed to operate on the straight portion of its magnetization characteristic, and the resistances in its armature and shunt field circuits are so adjusted that it is self-exciting without other excitation, or with relatively only a very little other excitation. Being thus tuned, it is very highly sensitive in response to any variation of its other excitation, which may sometimes be in the sense to support and sometimes to detract from the self-excitation.

Generator control potentiometer 59 is connected across the main constant voltage exciter 6. Control field winding 51 is excited from a tapped-off portion of control potentiometer 59, with a fixed proportion of the voltage across generator armature 20 fed back in opposition. This proportion of generator armature voltage is obtained from resistor 22 and choke 23, which together with resistor 24 form a fixed potentiometer across generator armature 20. The function of choke 23 is to introduce a component of opposing feed-back voltage proportional to rate of change of generator armature voltage, and thereby to lessen the tendency to hunting.

The selection of the circuit constants is such that under steady state conditions, the voltage fed back in opposition from resistor 22 and choke 23 is, either exactly or very nearly, equal and opposite to the control voltage applied from the tapped-off portion of control potentiometer 59, so that the current in control field winding 51 is low.

As the sections 41 and 42 of the field winding of exciter 4 warm up, their resistances rise, because they are wound with the usual copper wire; but resistors 43 and 44 are made of resistance wire having very low or negligible temperature coefficient of resistance, such as nickel-chrome alloy.

The increase of resistance which thus occurs in the load of sub-exciter 5 tends to diminish the degree of self-excitation provided by series field winding 52.

As the resistances of field winding sections 41 and 42 rise relative to those of resistors 43 and 44 with increase of temperature, the bridge becomes accordingly unbalanced, and auxiliary field winding 53 is excited in accordance with the degree of unbalance.

If shunt field winding 54 is omitted, auxiliary field winding 53 is so designed and adjusted that it will provide just the necessary boost to the self-excitation given by series field winding 52 to maintain sub-exciter 5 in tune, as the resistance of its load increases with rise of temperature.

When shunt field winding 54 is provided, it will be wound with the usual copper wire and will therefore be subject to increase of resistance with temperature, and this increase will likewise diminish the degree of self-excitation provided by this shunt field winding. The load circuit of sub-exciter 5 will be hot when its shunt field winding 54 is hot.

If series field winding 52 is omitted, therefore, auxiliary field winding 53 can be so designed and adjusted that it will provide just the necessary boost to the self-excitation given by shunt field winding 54 to maintain sub-exciter 5 in tune, when the resistance of this shunt field winding has risen to its "hot" value. The more closely the time-constant of temperature rise of the load, comprising exciter field winding sections 41 and 42, can be made equal with that of shunt field winding 54, the more accurate will be the degree the compensation which can be maintained throughout the range of temperature rise.

If both shunt field winding 54 and series field winding 52 are employed, auxiliary field winding 53 is so designed and adjusted that it will provide just the necessary boost to the self-excitation given by both of these windings to maintain sub-exciter 5 in tune when the resistances of the load and of the shunt field winding 54 have risen to their "hot" values.

Auxiliary field winding 53, when so designed and adjusted (whether both of field windings 52 and 54 are provided, or only one of them) will necessarily serve to increase the excitation of sub-exciter 5 under any conditions which cause the voltage drops across field winding sections 41 and 42 to rise relatively to the voltage drops across resistors 43 and 44. Such conditions obtain whenever the currents in field winding sections 41 and 42 are undergoing increase, and therefore auxiliary field winding 53 assists any increase of voltage of sub-exciter 5, which may be due to an increase in the excitation of control field winding 51. By giving this assistance, it not only speeds up the response of sub-exciter 5 to such an increase in control field excitation, but causes an overshoot of voltage output of sub-exciter 5 so long as the currents in exciter field winding sections 41 and 42 are still rising.

Further, while the current in field winding 53 is increasing, transformer action will restrict the build-up of current in control field winding 51 and will thereby limit the current which passes in that winding immediately after the setting of control potentiometer 59 has been changed.

The main constant voltage exciter 6 has a shunt field winding 61 with control rheostat 63, and has a series field winding 62 to give a level voltage characteristic.

The bucking exciter 3 has its field winding divided into sections 31 and 32 connected into a bridge with equal resistors 33 and 34 like the main field winding of generator exciter 4.

By its corners AB, the field winding bridge of bucking exciter 3 is connected in series with an adjustable resistor 75, and with a choke 77 normally short-circuited by a restifier 76, to form the output circuit of sub-exciter 7. Current flows through the bridge in the direction from B to A to excite the exciter 3 in the sense to buck the voltage of main constant voltage exciter 6.

Sub-exciter 7 has a series field winding 72 so designed and adjusted in relation with the resistances in circuit that this sub-exciter, which operates on the straight portion of its characteristic, is tuned at least when rectifier 76 is conductive.

Sub-exciter 7 is also provided with an auxiliary field winding 73 connected in series with an adjustable resistor 74 across the output corners CD, of the field winding bridge of bucking exciter 3.

Further excitation for sub-exciter 7 is provided by a control field winding 71.

Motor field control potentiometer 79 is connected across the main constant voltage exciter 6. Control field winding 71 is excited from a tapped-off portion of control potentiometer 79, with a voltage proportional to the current in motor field winding 11 fed back in opposition. The voltage proportional to motor field current is obtained from a resistor 12 which is connected in series with a choke 13 to form a shunt circuit across motor field winding 11. This shunt circuit is designed to have the same time-constant as motor field winding 11, and the same saturation characteristic, but relatively low conductance, so that the current through it will bear a constant proportion to the motor field current. Then the voltage across resistor 12 will similarly bear a constant proportion to the motor field current, and yet the power loss in resistor 12 will be low compared with that which would occur in a resistor which might alternatively be arranged to carry the whole of the motor field current. A small part 13a of choke 13 is also included in the circuit of control field winding 71 to introduce a component of opposing feed-back voltage proportional to the rate of change of motor field current, and thereby to lessen the tendency to hunting.

The auxiliary field winding 73 is so designed and adjusted that, like auxiliary field winding 53, it provides just the necessary boost to the self-excitation of sub-exciter 7 to maintain it in tune as the resistances of the field winding sections 31, 32, rise with increase of their temperatures. As in the case of sub-exciter 5, this will necessarily increase the speed of response of sub-exciter 7, and decrease the rush of current in control field winding 71 immediately after a change in the setting of control potentiometer 79 has been made.

When the current through the field winding bridge of bucking exciter 3 in the direction from B to A is decreasing, as a result (for example) of a decrease in the current through control field winding 71, the resulting unbalance in the bridge causes excitation of auxiliary field winding 73 in the sense to decrease or reverse the voltage generated by sub-exciter 7. If the current through the field winding bridge actually reverses, it tends to cause exciter 3 to boost the voltage of main constant voltage exciter 6 as applied to motor field 11. When this reversal of current occurs, rectifier 76 ceases to be conductive, and choke 77, which is constructed to have relatively high ohmic resistance, comes effectively into circuit to make less rapid any further change of the current in the field winding bridge in this sense. Any dangerous rise of regenerative current from motor armature 10, due to excessively rapid increase of excitation of motor M, is thus prevented. Adjustment of the degree of this effect of choke 77 is obtained by tappings on the choke.

When, however, the current in the field winding bridge of bucking exciter 3 in the direction from B to A is increasing to accelerate motor M, rectifier 76 prevents choke 77 from delaying the increase.

In Fig. 2 I show a modification of my invention. In this modification the rectifier 76', corresponding to rectifier 76 in Fig. 1, and the reactor or choke 77', corresponding to choke 77 in Fig. 1, are disposed in the control circuit for the control field 71. The electrical characteristics of choke 77' and rectifier 76' are so chosen that in this new location that novel results similar to those which these elements provide in the positions shown in Fig. 1 are also obtained in the new location. In either situation these units will make the response of bucking exciter 3 more rapid when its excitation is being increased than when it is being decreased.

In another modification of the particular arrangement described, resistors 43 and 44 are made with resistance values equal to those of winding sections 41, 42 when hot. Until the winding sections 41, 42 have become heated up, the bridge will then be unbalanced, and auxiliary field winding 53 will buck the self-excitation of exciter 5 to the necessary degree to maintain it in tune.

In the modification shown in Fig. 2, the control field 51 of the amplifying exciter 5 is divided into two parts as 51a and 51b. The part 51a is excited from a tapped-off portion of the potentiometer 59 while the other part 51b is excited from the voltage developed across resistor 22 and choke 23. The winding 51b is so energized as to oppose the effect of winding 51a. This arrangement has the advantage of avoiding any connection between the circuit of main exciter 6 and the armature circuit of the generator G and motor M.

In another modification of the arrangements described, the exciters 3 and 4 are omitted, and the field windings of the Ward-Leonard generator and motor are themselves connected as bridges supplied from, and controlling, tuned exciters which are arranged generally as the sub-exciters 5 and 6.

While I have limited my description and showings in the drawing to but two modifications, it is apparent that many other modifications may be provided without departing from the spirit of my invention. It is, therefore, intended that the appended claims be as broadly interpreted as prior art may permit.

I claim as my invention:

1. In a system of control for controlling the speed of a direct-current motor, in combination, a direct-current motor excited at a substantially constant value, a generator having a field winding, said generator being coupled to supply voltage to the motor, an exciter for the field winding of the generator, said exciter having a field divided into two sections, one section being in one leg of a bridge circuit and the other in another leg of the bridge circuit, a pair of constant resistance resistors, each having a resistance value equal to that of one of the sections, disposed in the other two opposite legs of the bridge circuit, an amplifying exciter connected to two opposite junctions of the bridge circuit for energizing said sections, a field winding on the amplifying exciter providing a component of excitation to the said field winding sections that is a function of the resistance change of the sections with changes in temperature of the sections, and a field winding for the amplifying exciter, interconnected with the circuit between the motor and generator, that automatically changes its excitation as a function of the rate of change of the voltage of the generator.

2. In a system of control for a direct-current motor, in combination, a direct-current motor having a field winding, a direct-current generator having a field winding, said generator and motor being connected in a loop circuit, a constant voltage exciter connected to two potentiometers, means interconnected with the loop circuit and one of said potentiometers for varying the excitation of the generator both as a setting of the said one potentiometer and the rate of change of the voltage of the generator, and means interconnected with the field winding of the motor and the other of said potentiometers for varying the excitation of the motor field both as a setting of the other potentiometer and the rate of change of the excitation current of the motor.

3. In a system of control for a direct-current motor, in combination, a generator having a field winding and a motor having a field winding, said generator and motor being connected in a loop circuit, a source of potential for the field windings, circuit means interconnected with the loop circuit for producing an electrical effect that is proportional to the rate of change of the voltage in the loop circuit, excitation control means for the generator interconnected with said source of potential and said circuit means to thus control the excitation of the generator as a function of the setting of the excitation control means and as a function of the rate of change of voltage in the loop circuit, other circuit means interconnected with the motor field winding for producing an electrical effect that is proportional to the rate of change of the motor field excitation.

4. In a system of control for a direct-current motor, in combination, a generator having a field winding and a motor having a field winding, said generator and motor being connected in a loop circuit, a source of potential for the field windings, circuit means interconnected with the loop circuit for producing an electrical effect that is proportional to the rate of change of the voltage in the loop circuit, excitation control means for the generator interconnected with said source of potential and said circuit means to thus control the excitation of the generator as a function of the setting of the excitation control means and as a function of the rate of change of voltage in the loop circuit excitation control means for the motor interconnected with the source of potential and the motor field winding to control the excitation of the motor as a function of the setting of the excitation control means and the rate of change of motor excitation current.

5. In a system of control for a direct-current motor, in combination, a generator having a field winding and a motor having a field winding, said generator and motor being connected in a loop circuit, a source of potential for the field windings, circuit means interconnected with the loop circuit for producing an electrical effect that is proportional to the rate of change of the voltage in the loop circuit, excitation control means for the generator interconnected with said source of potential and said circuit means to thus control the excitation of the generator as a function of the setting of the excitation control means and as a function of the rate of change of voltage in the loop circuit, a bucking generator in the motor field circuit adapted to delay increases of excitation of the motor.

6. In a system of control for a direct-current motor, in combination, a generator having a field winding and a motor having a field winding, said generator and motor being connected in a loop circuit, a source of potential for the field windings, circuit means interconnected with the loop circuit for producing an electrical effect that is proportional to the rate of change of the voltage in the loop circuit, excitation control means for the generator interconnected with said source of potential and said circuit means to thus control the excitation of the generator as a function of the setting of the excitation control means and as a function of the rate of change of voltage in the loop circuit, other circuit means interconnected with the motor field winding for producing an electrical effect that is proportional to the rate of change of the motor field excitation, excitation control means for the motor interconnected with the source of potential and the motor field winding to control the excitation of the motor as a function of the setting of the excitation control means and the rate of change of motor excitation current.

7. In a system of control for a direct-current motor, in combination, a generator having a field winding and a motor having a field winding, said generator and motor being connected in a loop circuit, a source of potential for the field windings, circuit means interconnected with the loop circuit for producing an electrical effect that is proportional to the rate of change of the voltage in the loop circuit, excitation control means for the generator interconnected with said source of potential and said circuit means to thus control the excitation of the generator as a function of the setting of the excitation control means and as a function of the rate of change of voltage in the loop circuit, other circuit means interconnected with the motor field winding for producing an electrical effect that is proportional to the rate of change of the motor field excitation, a bucking generator in the motor field circuit adapted to delay increases of excitation of the motor.

8. In a system of control for a direct-current motor, in combination, a generator having a field winding and a motor having a field winding, said generator and motor being connected in a loop circuit, a source of potential for the field windings, circuit means interconnected with the loop circuit for producing an electrical effect that is proportional to the rate of change of the voltage in the loop circuit, excitation control means for the generator interconnected with said source of potential and said circuit means to thus control the excitation of the generator as a function of the setting of the excitation control means and as a function of the rate of change of voltage in the loop circuit, excitation control means for the motor interconnected with the source of potential and the motor field winding to control the excitation of the motor as a function of the setting of the excitation control means and the rate of change of motor excitation current, a bucking generator in the motor field circuit adapted to delay increases of excitation of the motor.

9. In a system of control for a direct-current motor, in combination, a generator having a field winding and a motor having a field winding, said generator and motor being connected in a loop circuit, a source of potential for the field windings, circuit means interconnected with the loop circuit for producing an electrical effect that is proportional to the rate of change of the voltage in the loop circuit, excitation control means for the generator interconnected with said source of potential and said circuit means to thus control the excitation of the generator as a function of the setting of the excitation control means and as a function of the rate of change of voltage in the loop circuit, excitation control means for the motor interconnected with the source of potential and the motor field winding to control the excitation of the motor as a function of the setting of the excitation control means and the rate of change of motor excitation current, a bucking generator in the motor field circuit adapted to delay increases of excitation of the motor.

NORMAN HARRY SHAW.

REFERENCES CITED

The following references are of record in the file of this patent:

UNITED STATES PATENTS

| Number | Name | Date |
|---|---|---|
| 2,335,874 | Moyer et al. | Dec. 7, 1943 |
| 2,347,037 | Edwards et al. | Apr. 18, 1944 |
| 2,417,784 | Schaelchlin et al. | Mar. 18, 1947 |
| 2,448,442 | Kirschbaum | Aug. 31, 1948 |